3,663,662
HEAT-SHRINKABLE FILMS FROM ETHYLENE POLYMER BLENDS

Ralph Crosby Golike, Tonawanda, N.Y., and George Joseph Ostapchenko, Williamsville, and William Drake Garlington, Wilmington, Del., assignors to E. I. du Pont de Nemours and Company, Wilmington, Del.
No Drawing. Filed Aug. 23, 1968, Ser. No. 754,953
Int. Cl. C08f 29/12
U.S. Cl. 260—897 A
4 Claims

ABSTRACT OF THE DISCLOSURE

Heat-shrinkable film having improved heat sealing characteristics prepared by irradiative crosslinking of an oriented film of a blend of low density and high density ethylene polymers.

BACKGROUND OF THE INVENTION

Polyethylene film is used extensively for wrapping and packaging. In such uses, it is often desirable for the film to be heat-shrinkable so as to facilitate the preparation of a skin-tight package, and, in addition, be heat-sealable so as to be usable on automated packaging equipment. It is difficult to provide a film that satisfies both of these criteria, and previous attempts to do so have often resulted in films which required temperatures greatly in excess of 100° C. for heat-shrinking or had a relatively low shrink force. Other drawbacks frequently encountered were a narrow healing sealing range in the finished film, elaborate and expensive equipment required for its preparation or treatment, and production procedures that did not permit scrap recovery.

SUMMARY OF THE INVENTION

The instant invention relates to a polyethylene film which exhibits superior heat-shrink and heat-sealing characteristics. Specifically, the instant invention provides a crosslinked, oriented film of a blend of polymers comprising (a) about from 70% to 85% by weight, based on the total weight of the blend, of a low density polymer selected from the group consisting of polyethylene and copolymers of ethylene with olefinically unsaturated monomers copolymerizable therewith, the polymer having a density of about from 0.91 to 0.93 gram/cc. at 25° C., and (b) about from 30% to 15% by weight of a high density polymer selected from the group consisting of polyethylene and copolymers of ethylene with olefinically unsaturated monomers copolymerizable therewith, the high density polymer having a density of about from 0.94 to 0.98 gram/cc. at 25° C., the film having a shrinkage of at least 15% in each direction in the plane of the film at a temperature of 100° C., a shrink tension of at least 200 p.s.i. at 100° C. and a zero strength temperature of at least 175° C. in each direction in the plane of the film.

The instant invention further comprises a process for the preparation of these films which comprises forming a self-supporting film of the polymer blend indicated above, heating the film to a temperature of about from 90° C. to 115° C., stretching the film at least about 5× in each of two mutually perpendicular directions in the plane of the sheet, cooling the film under tension, and irradiating the film for a time sufficient to raise the zero strength temperature of the film to at least 175° C.

In those embodiments of the invention wherein the irradiating is by ultraviolet light, the blend of polymers further comprises about from 0.05% to 1.0% by weight of a polymeric photosensitizer having a phenone moiety.

DESCRIPTION OF THE PREFERRED EMBODIMENTS

The heat-shrinkable films of the instant invention are composed of blends of high density and low density ethylene polymers. The low density polymer can be polyethylene and copolymers of ethylene with at least one olefinically unsaturated monomer copolymerizable therewith, for example, those produced by free radical catalysis with monomers such as vinyl acetate, methyl methacrylate, ethyl acrylate, styrene, vinyl methyl ether, diisobutylene, methacrylic acid and acrylonitrile. Its density should be in the range of from about 0.91 to about 0.93 gram/cc. at 25° C.

The high density polymer can be linear polyethylene and linear copolymers of ethylene with an olefinically unsaturated monomer copolymerizable therewith, such as those produced by coordination catalysis with olefin monomers including $\alpha$-olefins having 3 to 20 carbon atoms such as propylene, 1-butene, 1-pentene, 1-hexene, 1-heptene, 1-octene, 1-decene as well as mixtures of these monomers. The density of the ethylene polymer in all cases should be from about 0.94 to about 0.98 gram/cc.

It is preferred that the blend of ethylene polymers contain about from 70% to 80% by weight of the low density polymer and about from 20% to 30% of the high density polymer. The high density component preferably comprises a copolymer of ethylene with another alpha olefin, and especially one having from 4 to 10 carbon atoms. In this preferred polymer blend, the high density component has a melt index of from about 0.4 to 1.5 and a density of from about 0.950 to about 0.975 gram/cc., and the low density component has a density of about from 0.910 to 0.920 gram/cc. and a melt index of about from 1.5 to 8.0.

The polymer film is blended in the desired proportions by any conventional blending technique which can produce a homogeneous blend. The resulting blend can be extruded, preferably from a melt of the blend, in a flat or tubular film by usual methods known to those skilled in the art. To obtain the desired heat shrinking characteristics, the film is then stretch-oriented, prior to irradiation, at least 5 times in each of two mutually perpendicular directions. It is found that films which have been stretch-oriented less than 5 times in each direction require an unduly long period of radiation to obtain the desired degree of crosslinking. These particular polymer blends can be extensively stretched prior to any further treatment, and can be stretched up to 7 and 10 times their original dimension in each of the two directions. The orientation temperature of these films will vary according to the particular polymer blend used in making the film. In general, however, the orientation temperature will be about from 90 to 115° C. After stretching, the film is cooled under tension, maintaining the sheet substantially at its expanded dimensions. Apparatus which can be used in the orientation is of the type generally used in the art, such as that described in detail in Goldman and Wallenfels U.S. Pat. 3,141,912, which is hereby incorporated by reference. At this point in their preparation, the films exhibit excellent heat-shrink characteristics, but are deficient in their heat sealing range.

The oriented films are then subjected to radiation to effect a crosslinking of the film. The particular type of radiation is not critical to the instant invention. Typical sources of high energy ionizing radiation which can be used in the instant invention include electron accelerator machines such as the Van de Graaff accelerators and insulating core transformers made by High Voltage Engineering Corp., resonant transformers made by General Electric Co., Dynamitrons made by Radiation Dynamics Inc., or Microwave Linear Accelerators made by Varian Associates and Applied Radiation Corp. X-rays and gamma rays from radioactive isotopes such as iron 59 or cobalt 60, and beta rays obtained from cobalt 60, carbon 14, phosphorus 32 and strontium 90 can also be used. The irradiation required to crosslink the oriented films is remarkably low. For example, a zero strength temperature of 200° C. is obtained in these films at a dosage of about from 0.5 to 2.0 megarad. Generally, dosages of from 0.5 to 6 megarad can be used. Substantially higher radiation levels, e.g., 6 to 10 megarad have been found to have adverse effects on the product.

In those embodiments of the instant invention wherein ultraviolet light is used as the source of radiation, the polymer blend further comprises about from 0.1% to 0.5% of a polymeric photosensitizer. The photosensitizer can be any polymer containing the phenone moiety, that is, containing the benzoyl radical, and which is compatible with the blend of polymers being used to produce the heat-shrinkable film. Particularly useful are the polymeric photosensitizers described in U.S. Pat. 3,214,492, hereby incorporated by reference, which comprise copolymers of ethylene with acrylic esters of benzophenone or acetophenone and ethylene methacryloxybenzophenone/methyl methacrylate terpolymer. Other photosensitizers include polymers of 4-methacryloxyanthraquinone, polymers and copolymers of acryloxyalkoxy and methacryloxyalkoxy substituted phenones, of acrylamidophenones and of vinyl substituted phenones.

For irradiation with ultraviolet light, any artificial light source can be used which produces ultraviolet light having a wavelength of about from 2000 angstroms to 3000 angstroms. Typical sources include carbon arc lamps and low pressure mercury vapor resonance lamps. Commercially available low pressure or high pressure mercury resonance lamps are especially well suited for this purpose. The length of exposure can vary from less than 1 second to 30 seconds or more depending upon the source and intensity of ultraviolet light, the amount of photosensitizer incorporated in the film, the thickness, extent of orientation and temperature of the film and the amount of crosslinking desired. The amount of crosslinking to be effected is determined by the heat sealing range required for a particular application. In general, the zero strength temperature, which is an indicator of the breadth of heat sealing range that is obtainable with a given film, should be at least 175° C., and preferably 200° C. The zero strength temperature is the temperature at which a film sample fails at 5 seconds under a tensile load of 20 p.s.i.

The products of the instant invention exhibit a high shrink strength at 100° C. and a wide heat seal range. Further, the process of the instant invention permits recovery and reprocessing of scrap film after orienting.

The instant invention is further illustrated by the following examples, in which parts and percentages are by weight.

Examples 1-3.—Irradiation with ultraviolet light

Three blended polymers are prepared by melt blending 75 parts branched polyethylene resin having a melt index of 4.1 and a density of 0.913 gram/cc. at 25° C. and 25 parts linear polyethylene resin comprising an ethylene/1-octene copolymer having a melt index of 0.45 and a density of 0.956 gram/cc. at 25° C. The linear polyethylene also contains 250 parts per million of an antioxidant, 2,6-di-t-butyl-4-methylphenol, 800 parts per million of mixed amide (approximately 533 parts of oleamide and 267 parts of stearamide) and 500 parts per million of silica, as well as ethylene/methacryloxybenzophenone/methyl methacrylate copolymer in amounts to provide levels of 0.1%, 0.2% and 0.4% of benzophenone moiety in the resin in Examples 1, 2 and 3 respectively. The blended resins extruded through an apparatus as described in U.S. Pat. 3,141,912, at a melt temperature of 200° C., and a die opening of 35 mils. The cast tubes, having a thickness of 20 mils, are stretched 5.8× in the machine direction and 5× in the transverse direction, at a temperature of 115° C.

The extruded and stretched films are then exposed to ultraviolet light for a period of approximately 1 second. The light source is a 2100 watt, 550 volt Hanovia 78 A lamp positioned 1 to 2 inches from the film. The treated films are thereafter characterized with respect to zero strength temperature. The shrinkage of the film upon immersion in boiling water is measured, as well as the shrink tension developed in both the machine and transverse directions when the film is heated to 100° C. The results are shown in Tables I, II and III.

A control film is similarly prepared and evaluated, except that the ethylene/methacryloxybenzophenone/methyl methacrylate copolymer sensitizer is omitted and the film is not irradiated.

TABLE I.—DYNAMIC ZERO STRENGTH TEMPERATURE

| | Sensitizer level, percent | Zero strength temperature, ° C. | |
|---|---|---|---|
| | | MD | TD |
| Example Number: | | | |
| 1 | 0.1 | 243 | 251 |
| 2 | 0.2 | 255 | 247 |
| 3 | 0.4 | 242 | 238 |
| Control | None | 145 | 142 |

TABLE II.—SHRINKAGE AT 100° C.

| | Percent shrinkage | |
|---|---|---|
| | MD | TD |
| Example Number: | | |
| 1 | 21 | 34 |
| 2 | 22 | 32 |
| 3 | 19 | 31 |
| Control | 20 | 32 |

TABLE III.—SHRINK TENSION AT 100° C.

| | Shrink force (p.s.i.) | |
|---|---|---|
| | MD | TD |
| Example Number: | | |
| 1 | 348 | 351 |
| 2 | 327 | 338 |
| 3 | 301 | 342 |
| Control | 346 | 386 |

The test films show a large increase in zero strength temperature and a corresponding improvement in heat sealing performance on automatic packaging equipment. With the films of Examples 1, 2 and 3, effective sealing is attained over a temperature range of 120° C. to 200° C. in contrast to the performance with the control film, which has not been given the ultraviolet treatment, which is sealable only in a range of 115° C. to about 160° C.

Example 4

A heat-shrinkable film is prepared as described in Examples 1-3, except that the photosensitizer is omitted from the resin blend. The film is irradiated to a dosage of two megarads by exposing it under the beam of a Van de Graaff accelerator, manufactured by High Voltage Engineering Corporation. The properties of the irradiated film and an unradiated control film are summarized below.

| Property | Control | Irradiated film |
|---|---|---|
| Zero strength temperature, ° C. MD/TD | 140/040 | 260/260 |
| Percent shrinkage (MD/TD) boiling water | 23/34 | 23/34 |
| Shrink tension (100° C.) (p.s.i. MD/TD) | 293/426 | 266/457 |
| Heat seal range, ° C., bar sealer | 120-160 | 125-200 |

The film exhibits a marked increase in zero strength temperature and a broadening of the heat sealing range as a result of the irradiation. This irradiated film shows excellent heat sealing performance on automatic packaging machinery.

The above example is repeated, using heat-shrinkable films made from blends of low density and high density polyethylene resins in the ratio of 80/20 and 85/15, as described in U.S. Pat. 3,299,194. On exposure to high energy irradiation as described above, these films exhibit a similar increase in zero strength temperature and improvement in heat sealing performance.

We claim:
1. A crosslinked, oriented film of a blend of polymers comprising
   (a) about from 70% to 85% by weight, based on the total weight of the blend, of a low density polymer selected from the group consisting of polyethylene and copolymers of ethylene with olefinically unsaturated monomers copolymerizable therewith, the polymer having a density of about from 0.91 to 0.93 gram/cc. at 25° C., and
   (b) about from 30% to 15% by weight of a high density polymer selected from the group consisting of polyethylene and copolymers of ethylene with olefinically unsaturated monomers copolymerizable therewith, the high density polymer having a density of about from 0.94 to 0.98 gram/cc. at 25° C., the film having a shrinkage of at least 15% in each direction in the plane of the film at a temperature of 100° C., a shrink tension of at least 200 p.s.i. at 100° C. and a zero strength temperature of at least 175° C. in each direction in the plane of the film.

2. A crosslinked film of claim 1 having a zero strength temperature of at least 200° C. in each direction in the plane of the film.

3. A film of claim 1 wherein the low density polymer comprises about from 70 to 80% by weight of the film and the high density polymer comprises about from 20 to 30% by weight of the film.

4. A film of claim 3 further comprising about from 0.05% to 1.0% by weight of a polymeric photosensitizer having a phenone moiety.

References Cited

UNITED STATES PATENTS

| | | | |
|---|---|---|---|
| 3,299,194 | 1/1967 | Golike | 264—210 |
| 3,214,492 | 10/1965 | Tocker | 260—878 |

MURRAY TILLMAN, Primary Examiner

C. SECCURO, Assistant Examiner

U.S. Cl. X.R.

204—159.14, 159.2; 260—897 R, 897 B, 94.9 GA; 264—289